United States Patent
Vesin et al.

(10) Patent No.: US 12,264,882 B2
(45) Date of Patent: Apr. 1, 2025

(54) MODULAR HEAT-STORAGE ASSEMBLY WITH PHASE-CHANGE MATERIAL, THE MANUFACTURE OF WHICH IS SIMPLIFIED

(71) Applicants: COMMISSARIAT A L'ENERGIE ATOMIQUE ET AUX ENERGIES ALTERNATIVES, Paris (FR); GRIMS, Villette d'Anthon (FR)

(72) Inventors: Sébastien Vesin, Grenoble (FR); Cyrille Grimaud, Villette d'Anthon (FR); Louane Grimaud, Villette d'Anthon (FR)

(73) Assignees: COMMISSARIAT A L'ENERGIE ATOMIQUE ET AUX ENERGIES ALTERNATIVES, Paris (FR); GRIMS, Villette d'Anthon (FR)

( * ) Notice: Subject to any disclaimer, the term of this patent is extended or adjusted under 35 U.S.C. 154(b) by 169 days.

(21) Appl. No.: 18/150,959

(22) Filed: Jan. 6, 2023

(65) Prior Publication Data
US 2023/0221081 A1    Jul. 13, 2023

(30) Foreign Application Priority Data
Jan. 7, 2022   (FR) .................................... 22 00118

(51) Int. Cl.
F28D 17/00    (2006.01)
F28D 20/02    (2006.01)

(52) U.S. Cl.
CPC ......... *F28D 20/023* (2013.01); *F28D 20/021* (2013.01)

(58) Field of Classification Search
CPC .............................. F28D 20/023; F28D 20/021
USPC ......................................................... 165/10
See application file for complete search history.

(56) References Cited

U.S. PATENT DOCUMENTS

| 2018/0313613 A1 | 11/2018 | Chopard et al. |
| 2019/0011147 A1 | 1/2019 | Chopard et al. |

FOREIGN PATENT DOCUMENTS

| AU | 2019 100 692 A4 |    | 7/2019 |
| CN | 106595084 A | * | 4/2017 |
| CN | 109489462 A | * | 3/2019 |
| CN | 111 765 791 A |    | 10/2020 |
| FR | 2 875 432 A1 |    | 3/2006 |
| FR | 2 943 410 A1 |    | 9/2010 |
| FR | 2 996 631 A1 |    | 4/2014 |

(Continued)

OTHER PUBLICATIONS

French Preliminary Search Report issued Aug. 16, 2022 in FR 22 00118 filed on Jan. 7, 2022, 9 pages (with Translation of Category of Cited Documents and Written Opinion).

*Primary Examiner* — Davis D Hwu
(74) *Attorney, Agent, or Firm* — Oblon, McClelland, Maier & Neustadt, L.L.P.

(57) ABSTRACT

The invention relates to a modular assembly (E) for storing heat by phase-change material including a plurality of heat-storage modules (M1) attached to one another, the heat-storage assembly comprising a vessel (2). At least two adjacent modules are disposed so that a porous external wall (6b) of one of the modules (M1) is arranged facing a porous external wall (6b) of the other of the modules (M1), and so that a solid external wall (6a) of one of the modules (M1), forming one of the parts of the vessel, is attached to a solid external wall (6a) of the other of the modules (M1), forming another part of the vessel.

18 Claims, 8 Drawing Sheets

(56) References Cited

FOREIGN PATENT DOCUMENTS

| GB | 2 519 742 A | 5/2015 |
|---|---|---|
| WO | WO 2015/189450 A1 | 12/2015 |

\* cited by examiner

MODULAR HEAT-STORAGE ASSEMBLY WITH PHASE-CHANGE MATERIAL, THE MANUFACTURE OF WHICH IS SIMPLIFIED

TECHNICAL FIELD AND PRIOR ART

The present invention relates to a system for storing heat by a phase-change material with simplified manufacture.

Systems for storing heat by phase-change material find their application in many fields, for example in the storage of heat in solar power stations and in heat and/or cold systems, urban systems, or industrial systems.

Heat-storage systems that are particularly advantageous are the systems using a tube and calandria heat exchanger filled with phase-change material and tubes passing through the vessel and connected to a heat-transfer source. The heat transfer medium, circulating in the tubes, exchanges heat with the phase-change material. During a phase change, the heat-transfer fluid arrives at a temperature higher than the melting point of the phase-change material and yields energy thereto, which causes the melting of the phase-change material, the heat-transfer medium leaves the system at a temperature below its entry temperature. During a discharge phase, the heat-transfer fluid enters the system at a temperature below the crystallisation temperature of the phase-change material and recovers the previously stored energy, which causes solidification of the phase-change material. The heat-transfer fluid leaves the system at a temperature above its entry temperature.

However, phase-change materials have the drawback of having low thermal conductivity, for example in the case of octadecanol, the mean thermal conductivity of which is of the order of 0.3 W/mK, a typical value of materials with low conductivity, or even thermally insulating ones.

It is therefore necessary to optimise the thermal conduction between the heat-transfer fluid and the phase-change material. One of the methods usually used for this is storage of the tube and calandria type consisting of a vessel incorporating a cluster of tubes often provided with fins for diffusing heat. However, in order to keep a reasonable cost price, the finned tubes used are often standard finned tubes, in particular in the field of petrochemistry, having fins with a relatively small diameter, for example of the order of 5 cm, which involves using a large number of finned tubes to sufficiently diffuse the heat in the phase-change material. However, this large number of tubes must be assembled with the upper and lower collecting plates, for example by welding or flanging. This involves a long manufacturing time and a high manufacturing cost. Furthermore, the risks of leakage are increased.

In addition, because of the circulation of the heat-transfer fluid in a large number of tubes, it has a reduced speed, which may in some cases require the use of special devices, referred to as inserts, in the tubes, making the manufacture of the tubes more complex and increasing the cost of the heat-storage system.

Document EP2904343 describes a heat-storage system including a calandria, tubes and inserts made from aluminium attached to the external face of the tubes and diffusing the heat in the phase-change material, which makes it possible to reduce the number of tubes. However, clearance exists between the tube and the insert, which is detrimental to the heat transfer between the tubes and the insert.

Apart from the problems mentioned above in relation to ease of manufacture, it should be noted that deploying heat storage means in the heart of towns, more particularly in substations of the systems, poses additional constraints related to the lack of space and the high pressure on property that often applies to urban environments.

Consequently there remains a need for optimising the current solutions not only for facilitating the manufacture of heat-storage systems, but also so as to be able to present them in several sizes and several forms, in particular to facilitate incorporation thereof in the substations of heat systems.

DISCLOSURE OF THE INVENTION

Consequently one aim of the present invention is to offer a heat-storage solution with phase-change material with simplified implementation, offering improved performances, and able to easily adapt in form and size to the location dedicated for installation thereof.

To do this, the object of the invention is first of all a modular assembly for storing heat by phase-change material including a plurality of heat-storage modules attached to one another, the heat-storage assembly comprising a vessel, each module for storing heat by phase-change material being delimited by a plurality of external walls, and comprising:

- at least one heat exchanger including first and second connection ends intended to be connected to a heat-transfer fluid system, said first and second connection ends entering and emerging from the vessel,
- a structure intended to contain a phase-change material, said structure comprising a porous matrix with communicating cells through which said heat exchanger passes and in contact with the external surface of said heat exchanger, said matrix being obtained by moulding around said heat exchanger,
- at least one of the external walls of the module, referred to as a solid external wall, being formed by moulding directly on the porous material so as to form a part of said vessel of the heat-storage assembly,
- at least one of the other external walls of the module, referred to as a porous external wall, being formed by the porous matrix,
- and, among the modules of the heat-storage assembly, at least two adjacent modules are disposed so that a porous external wall of one of the modules is arranged facing a porous external wall of the other one of the modules, and so that a solid external wall of one of the modules is attached to a solid external wall of the other one of the modules.

Through its modular character, the invention makes it possible to perfectly adapt in size and form to the constraints related to its location, sometimes complicated when it is a case of an urban environment. It suffices in fact to adapt the number of heat-storage modules, and the arrangement thereof. Preferably, the modules can be stacked vertically, so as to increase the heat-storage capacity without increasing the footprint on the ground. Nevertheless, according to the constraints encountered and the requirements observed, the modules can also or alternatively be juxtaposed horizontally.

By attaching the solid external walls to one another, they help to benefit, in a simple and controlled manner, from a vessel having high mechanical strength. Moreover, the attachments between the edges of the solid external walls can advantageously be implemented from the outside of the assembly, which greatly facilitates accessibility thereof, in particular for testing and inspection operations.

Finally, forming at least a part of the vessel by moulding directly on the porous matrix greatly facilitates the production of the modules, and the performances of the latter are ensured partly by the excellent contact observed between the heat exchangers and the porous matrix. This solution in fact confers great adhesion between the porous matrix and the heat exchangers, improving the heat transfer from these heat exchangers to the module structure, and vice-versa.

The invention preferably has at least one of the following optional features, taken in isolation or in combination.

Preferably, said first and second connection ends of said heat exchanger pass through at least one solid external wall of each heat-storage module. With this design, it is advantageously no longer required to attach at least one end plate on the connection ends, or to assemble them sealingly thereon. The manufacturing method is simplified thereby.

Preferably, the vessel is entirely produced by solid external walls of the modules. This solution is particularly advantageous in that it makes it possible to obtain a finalised heat-storage assembly, by simple assembly/attachment of the modules that make it up. As will be described below, an example of assembly of the modules consists in welding them to one another, these welding operations being able to be prepared partly before the modules are installed, in order to facilitate the production of the modular assembly. Alternatively, the vessel is produced by solid external walls of the modules to form a vessel body, closed by a cover attached to these solid external walls. This solution is preferred in particular when a heat-storage assembly with removable cover is sought, and/or with a reservoir for the phase-change material. Thus, when this material expands as it melts, it can emerge through the porous external wall or walls and enter this reservoir in the liquid state.

Preferably, the cover is attached by mechanical flanging on the vessel body, although other types of connection can be envisaged, reversible or not, without departing from the scope of the invention.

Preferably, two solid external walls of two adjacent modules are attached to each other by butt-jointing their facing edges, preferably by welding.

Preferably, at least one of the solid external walls of the modules is formed directly during the moulding of the matrix and in a single piece with the matrix. This particularity greatly simplifies the manufacturing method.

According to another possibility, at least one of the solid external walls of the modules is formed on the matrix after the moulding thereof. This makes it possible to use a different material for producing the solid external wall, advantageously a material offering properties of thermal insulation with respect to foam. Thus it is preferably ensured that at least one of the solid external walls of the modules is made from a material having thermal conductivity lower than that of the matrix of its associated module.

Preferably, the porous matrix is made from metal material, for example aluminium or aluminium alloy.

Preferably, said heat exchanger is a tube. In this case, the connection ends are therefore ends of these tubes. These are configured to be connected to each other, by threaded connection, by welding, or by any other connection deemed appropriate, in particular mechanical connections.

In another example, the heat exchangers are exchanger plates, and the connection ends are for example tubes attached to the edges of the plates and providing the supply and discharge of heat-transfer fluid. In a variant, a distribution chamber and a collection chamber are provided at the ends of the exchanger plates.

The use of a porous structure used from metal material provides very good diffusion of the heat in the phase-change material. The efficacy of the charging and discharging is improved. Furthermore, the number of tubes can be reduced, which makes it possible not to have recourse to inserts in the tubes, and the cost price can thus be reduced.

Highly advantageously, the porous matrix or foam includes a first zone between the tubes having a first porosity and in contact with the tubes, and a second zone with second porosity surrounding the first zone and with a porosity substantially less than the first porosity. This matrix ensures very good thermal conduction between the tubes and the matrix by reducing the quantity of phase-change material in contact with the tubes, the phase-change material having low thermal conductivity. In other words, the tubes are surrounded by a layer (or skin) of low-porosity metal material forming padding around the tubes and adhering to the tubes. Furthermore, the adhesion of the metal structure around the tubes is improved.

Preferably, at least one of the modules is equipped with a plurality of heat exchangers, preferably configured to be connected in parallel to a heat-transfer fluid system and wherein the first connection ends are intended to be connected to a hydraulic service tank and the second connections ends are intended to be connected to a second hydraulic service tank.

Preferably, each module has a roughly parallelepipedal shape, and they are assembled so that the storage assembly also has a roughly parallelepipedal shape. This parallelepipedal shape is particularly well adapted in the context of a modular design since it allows vertical and/or horizontal stacking of these modules, so as to adapt best to the constraints of the environment in which the storage system is to be installed. Nevertheless, other shapes can be envisaged for the modules, such as roughly cylindrical or semi-cylindrical shapes.

According to a first preferred embodiment of the invention, the heat-storage assembly is formed by two modules in each of which four of its six external walls are solid external walls, and the other two porous external walls, the two modules being assembled with each other so that the eight solid external walls form a vessel body, closed by a cover attached to these solid external walls. Alternatively, it is possible to envisage the same two modules with five of their six external walls formed by solid external walls, so that, after they are attached to one another, the whole of the vessel is obtained. The result is simplicity as well as rapidity of manufacture of the heat-storage assembly.

According to a second preferred embodiment of the invention, the heat-storage assembly is formed by four modules in each of which four of its six external walls are solid external walls, and the other two porous external walls, the four modules being assembled with each other so that the sixteen solid external walls form the whole of the vessel. Alternatively, it is possible to envisage the same four modules with, for two of them, only three of their six external walls formed by solid external walls. This makes it possible, after the modules are attached to one another, to provide an opening in order to receive a cover for completing the vessel.

For assemblies with larger volumes, one or more internal modules without any solid external wall is also envisaged. In this case, these internal modules are surrounded by several modules each comprising one or more solid external walls, for example one, two or three.

Another object of the invention is a heat-storage system including at least one such modular assembly, and phase-change material filling the cells of the matrices of the modules.

Finally, an object of the invention is a method for manufacturing such a modular heat-storage assembly, including the manufacture of the modules, then the attachment thereof to one another by attaching their solid external walls to one another.

Preferably, the manufacture of each module comprises:
- supplying a preform comprising core plates and at least one heat exchanger between the cores,
- placing the preform in a mould,
- introducing a liquid metal into the preform,
- solidifying the metal,
- removing the cores.

Other advantages and features of the invention will emerge in the following non-limitative detailed description.

BRIEF DESCRIPTION OF THE DRAWINGS

The present invention will be best understood on the basis of the following description and the accompanying drawings, on which.

DETAILED DESCRIPTION OF EMBODIMENTS

Figure 1:
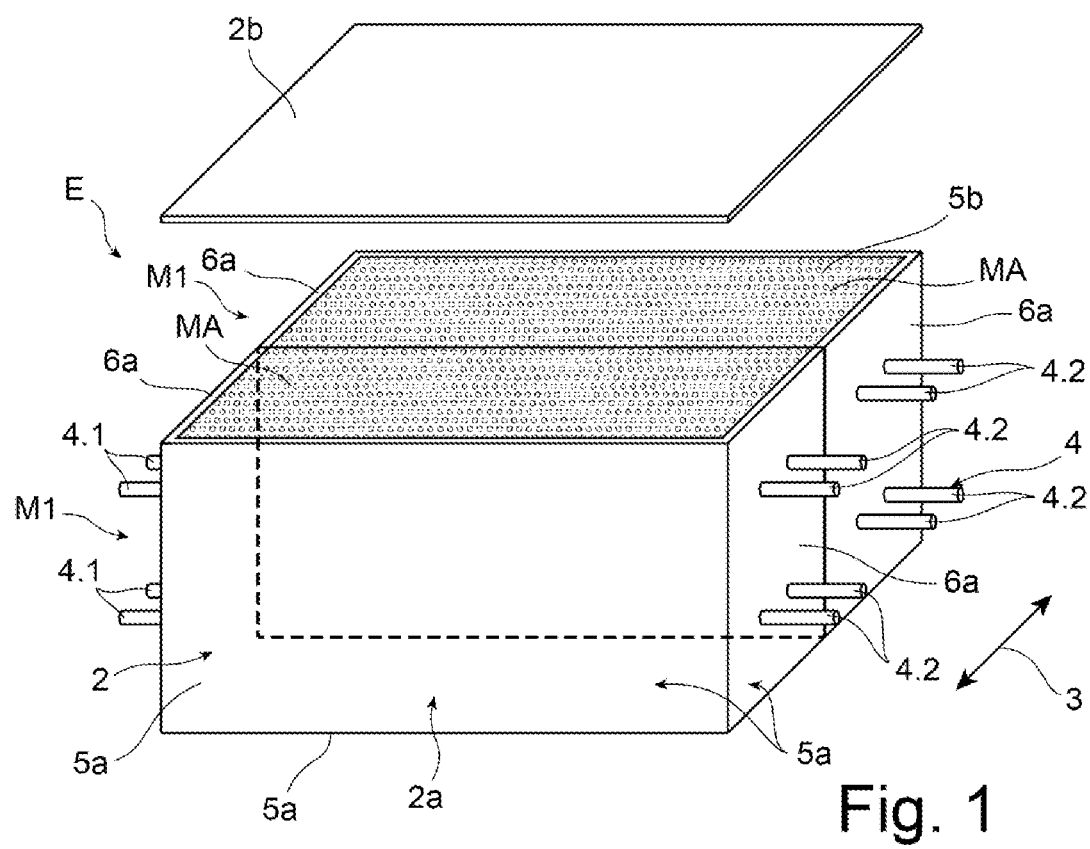
FIG. 1 is a schematic perspective view, partially exploded, of a modular heat-storage assembly for a heat-storage system with phase-change material, the assembly being in the form of a first preferred embodiment of the invention.

FIG. 1 shows a modular heat-storage assembly E of a heat-storage system using phase-change material.

The modular assembly E is here in the form of a first preferred embodiment of the invention, wherein it is formed by means of two heat-storage modules M1. The two modules M1, attached to each other, are each in roughly parallelepipedal in shape, of identical design and arranged facing each other symmetrically with respect to each other. The two modules M1 are here adjacent in a stacking direction 3 corresponding for example to a vertical or horizontal direction, so that the modular assembly obtained E also has a roughly parallelepipedal shape.

The assembly E has a calandria or vessel 2, forming the external envelope of the assembly. More precisely, the vessel 2 is here formed by a vessel body 2a defined by the solid external walls of the modules, as well as by a cover 2b attached to these same solid external walls of the modules, as will be described below.

Generally, the external surface of the vessel of the module is covered by a thermally-insulating material forming lagging (not shown), to reduce the heat losses from the assembly E to the outside. The material and the thickness of this thermally-insulating cladding are conventional, and selected according to the requirements encountered.

Figure 1A:
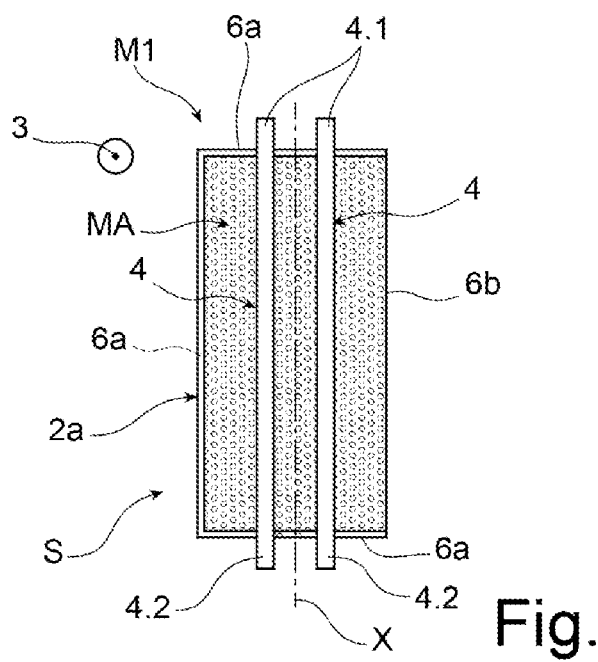
FIG. 1A is a schematic view in longitudinal section of one of the two modules forming the assembly in FIG. 1, taken along the plane P in FIG. 1B.
Figure 1B:
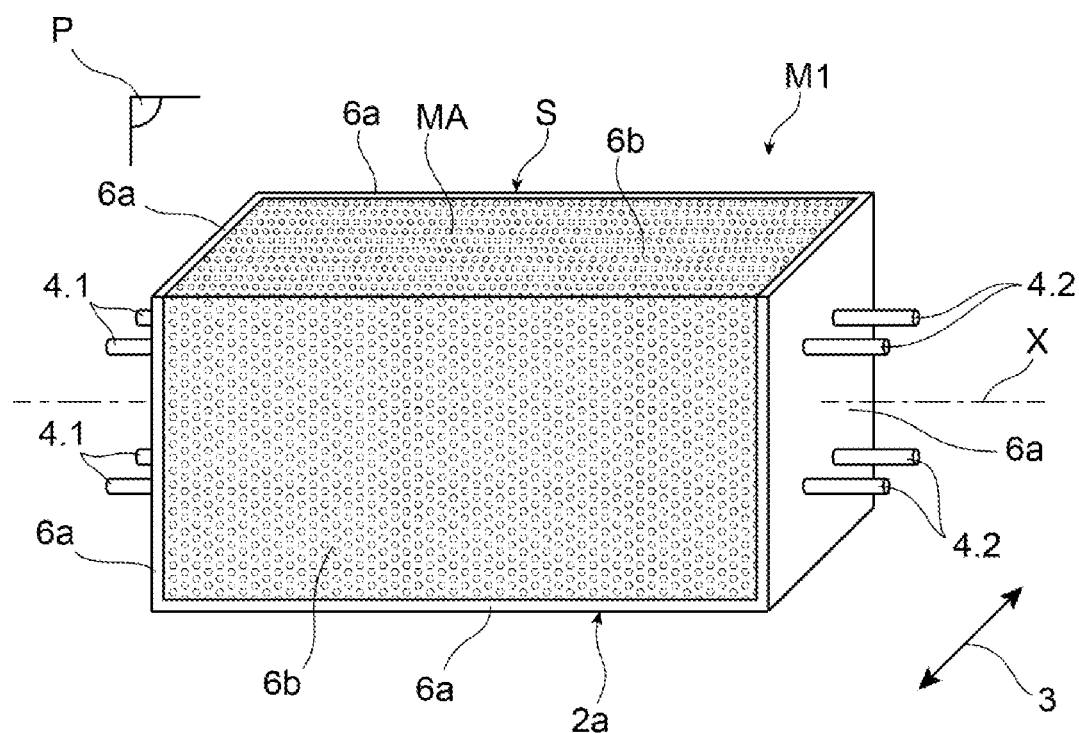
FIG. 1B is a schematic perspective view of the module shown on the preceding figure.
Figure 1C:
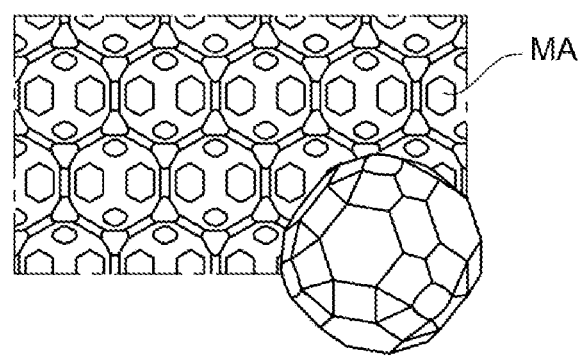
FIG. 1C is a photograph of an example of a matrix that can be used in the heat-storage module shown in the preceding figures.

With reference now to FIGS. 1A to 1C, one of the two heat-storage modules M1 with phase-change material will be described. The module M1 includes a part of the vessel body 2A formed by means of several of its external walls, a total number of six. The module M1 extends along a longitudinal axis X, corresponding to the axis of the large dimension of its parallelepipedal shape M1.

Tubes 4 are disposed in the part of the vessel body 2a defined by the module M1. In this example, the tubes 4 extend along the longitudinal direction X, these tubes 4 passing through said part of the vessel body 2a containing a phase-change PCM material.

A first end 4.1 of the tubes 4 is intended to be connected to a source of hot heat-transfer fluid or to a system using a hot heat-transfer fluid, and a second end 4.2 of the tubes is intended to be connected to a reservoir of cold heat-transfer fluid or to a system using a cold heat-transfer fluid.

In the present application, "hot heat-transfer fluid" means a heat-transfer fluid at a temperature higher than the melting point of the phase-change material, it is therefore able to yield up energy to the phase-change material, and "cold heat-transfer fluid" means a heat-transfer fluid at a temperature below the crystallisation temperature of the phase-change material, it is therefore able to extract energy from the phase-change material.

For purposes of simplicity, the phase-change material will be referred to as PCM material in the remainder of the description.

For example, the PCM material is selected from paraffins, fatty alcohols, fatty acids, sugar alcohols, salt hydrates, etc.

The heat-transfer fluid may be liquid when it is hot and, when it is cold, the fluid then does not change phase during phases of charging and discharging the module, or be in vapour form when it is hot and liquid when it is cold, a phase change of the heat-transfer material then taking place during charging and discharging phases.

A structure S of the module M1 includes a matrix MA made from porous alveolar form, which may be metallic. Thus this matrix MA is preferentially a metallic alveolar matrix with open pores, even more preferentially in the form of foam.

This foam is composed of a plurality of open alveoli, communicating with each other and emerging on the outside of the matrix. The alveolar foam is a stochastic structure or a regular structure, ordered and homogeneous or not. The cells are for example zonohedra, for example Kelvin cells, which have a truncated octahedron form, and are connected together by strands.

On FIG. 1C a representation of an example of a matrix can be seen. The mean diameter of the cells may be between 10 mm and 100 mm, and the strands have a thickness of a few mm.

The matrix MA may also include alveoli having geometric variants with respect to one another. The alveoli may have other forms, cylindrical, parallelepipedal, with a polyhedral base, in particular with an octagonal base, or square or other.

Preferably, the pores have a mean diameter of between 10 mm and 100 mm. Preferably also, the thickness of the strands is of the order of a few millimetres.

In one embodiment, the material of the matrix is metallic, for example made from aluminium, aluminium alloy, nickel-based alloy or cast steel, or based on copper. Metal materials have the advance of offering high thermal conductivity.

In another embodiment, the matrix is produced from a non-metallic material, for example from borosilicate glass, from sodo-lime-silica glass, from composite, or from any other material compatible with the manufacturing method described and used for obtaining the matrix MA. The material is selected so as to be compatible with the PCM material and so as to be compatible with the operating temperatures of the storage system.

The matrix MA is produced by single-piece and single-layer overmoulding around the tube 4, each forming a heat exchanger. In this way, the matrix MA is in contact with the external surface of the tube 4. This solution confers great adhesion between the porous matrix MA and the tubes 4, improving the heat transfer from the tubes to the structure, and from the structure to the tubes. The matrix MA is produced by a moulding method using a preform produced from cores. An example of a manufacturing method will be described below.

The tubes may be made from carbon steel, from stainless steel or any other metal having a sufficient melting point for withstanding the melting temperature of the material of the matrix during the moulding method.

The use of a porous matrix for diffusing the heat in the PCM material or for extracting it therefrom makes it possible to reduce or even eliminate the zones of PCM material that would be difficult to access thermally and would therefore not participate in the heat storage.

Figure 2:
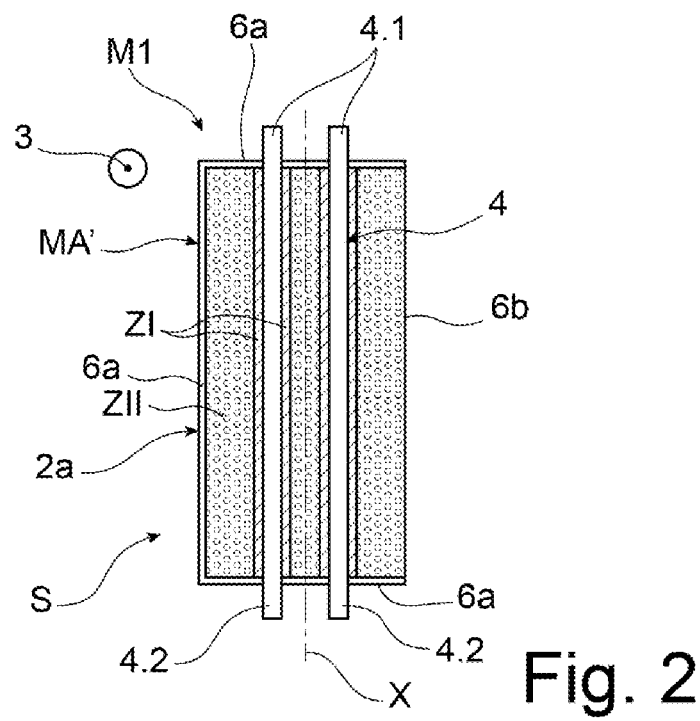
FIG. 2 is a view in cross-section similar to that in FIG. 1A, with the heat-storage module being in the form of an alternative.

An alternative is shown on FIG. 2. The heat-storage module M1 is such that the moulding of the matrix MA' around the tubes 4 is implemented so that zones ZI of the matrix surrounding the tubes and in proximity to these have a porosity substantially less than those of the zones ZI further away from the tubes. The zones ZI each form a sheath of low-porosity metal material, surrounding the tubes 4 and in contact with them. The zones ZII of the material distant from the tubes have for example a porosity of between 75% and 95%, and the porosity of the zones ZI is between for example 0% and a few %. The porosity of the alveolar structure can be calculated as follows: the mass $m_1$ of the alveolar structure is measured in kg. The alveolar structure is placed in a receptacle and completely immersed in water, which is poured up to a given graduation. The mass $m_2$ of the assembly formed by the alveolar structure and the water is measured in kg. The receptacle is emptied and then filled solely with water up to said graduation. The mass $m_3$ of water is measured in kg.

The volume of the alveolar structure $V_{sol}$ is determined in litres (l).

The void fraction $\varepsilon$ is calculated in accordance with the following equation, where $\rho$ is the density of the water in kg/l:

$$\varepsilon = 1 - \frac{m_3 - (m_2 - m_1)}{\rho V_{sol}} \qquad \text{[Math 1]}$$

The low-porosity zones ZI make it possible to reduce or even eliminate the presence of PCM material directly in contact with the tubes, the PCM material generally having low thermal conductivity. In addition, these zones ZI, or skins, improve the heat transfers in the various directions of the matrix, these zones homogeneously surrounding the tubes. These zones ZI forming padding externally on the tubes are produced by reserving free volumes in the preform around the tubes, these free volumes moreover favouring the flow and distribution of the molten material inside the mould, during the pouring of the liquid metal.

The padding has for example a thickness of a few millimetres. By way of non-limitative example, it has a thickness of between 5 mm and 10 mm, for tubes with a diameter of 17.2 mm and a thickness of 2 mm.

The tubes 4 are preferably produced from a material different from that of the matrix, the material of the tubes being able to withstand the pressure of the heat-transfer fluid, and adapted to the heat-transfer fluid.

Whatever the implementation envisaged for the porous matrix MA, MA', the structure S of the module also includes a plurality of external walls, here six walls corresponding respectively to the six faces of the parallelepiped.

In this first preferred embodiment of the invention, four of the six external walls are produced so as to be in a single piece with the porous matrix and simultaneously therewith, so as to form four solid external walls 6a.

The preform and the mould are designed for forming the solid walls 6a when the matrix is moulded. They are thus formed from the same material as the matrix MA, MA', and produced solidly so as to be impermeable to the PCM material. Producing the wall in the same material as that of the matrix has the advantage of affording simplified implementation. Furthermore, the difficulties relating to differences in coefficient of expansion values are limited.

According to one alternative, the four solid external walls 6a are formed in a material different from that of the matrix MA, MA'. This implementation advantageously makes it possible to have solid walls 6a produced in a material that is less thermally conductive than the matrix MA, MA' so as to limit the thermal losses from the storage module to the outside. The external walls 6 are produced in another material compatible with the production of the matrix, and which enables it to keep its qualities of impermeability to the PCM material, of mechanical resistance to the pressure exerted by the inside of the storage module, and of compatibility with the PCM material in the range of temperatures of use of the storage module.

For example, in the case where the material of each wall 6a has a melting point below that of the material MA, the operating method for producing the module can consist of initially pouring the molten material making up the matrix MA and then leaving the matrix MA to cool until the temperature is below the melting point of the material of the wall 6a, in order secondly to pour the molten material making up the wall 6a. The preforms are thus designed for delimiting the two zones, i.e. the matrix MA, MA' and the wall 6, and to allow the pouring of the two different materials in two steps in each of the distinct zones. For example, preforms specific to the production of each solid wall 6a could be attached following the production of the matrix MA, MA'. For example, each wall 6a could be produced from a material advantageously having lower thermal conductivity than the matrix MA, MA', or even better mechanical strength or better suitability for thermomechanical deformation or better impermeability to the PCM material.

One of the advantages of producing at least one solid wall 6a from a material different from that of the matrix is using a material that is less thermally conductive for this wall. For example, the matrix MA, MA' can be produced from cast aluminium alloys that in the majority of cases have thermal conductivities at 20° C. of the order of 120 W·m⁻¹·K⁻¹ to 160 W·m⁻¹·K⁻¹.

By way of example, the thermal conductivity at 20° C. of the A-S7G06 cast aluminium alloy is equal to 160 W·m⁻¹·K⁻¹ and that of the A-S5U3G aluminium alloy is equal to 120 W·m⁻¹·K⁻¹.

The wall can be produced from a material that is more thermally insulating than aluminium and alloys thereof, for example from cast steel having a thermal conductivity at 20° C. equal to 55 W·m⁻¹·K⁻¹. Other materials can still be envisaged, without departing from the scope of the invention.

The thermal conductivity of solids can be measured directly or indirectly, i.e. by measuring their thermal diffusivity, which involves also knowing their density and their specific heat. Thermal conductivity can be measured by the hot wire or hot disc method, while thermal diffusivity can be measured by the (laser) flash method.

Preferably, the material of the matrix and the material of the solid walls 6a are selected so that their coefficients of thermal expansion are sufficiently close to limit the differential expansions between the matrix and the walls.

For example, aluminium, steel and cast iron can be used to form the matrix and/or the solid walls. The values of linear expansion coefficients as a function of the temperature of materials are given below:
Aluminium: $23 \times 10^{-6}$ K⁻¹
Steel: $12 \times 10^{-6}$ K⁻¹
Cast iron: $10.5 \times 10^{-6}$ K⁻¹

The other two external walls of the module are porous external walls 6b. These are two adjacent walls 6b, adjacent to each other, and each extending parallel to the direction of the tubes 4. These porous external walls 6b correspond to the non-clad face of the porous matrix.

When the two adjacent modules M1 are assembled to form the modular assembly E of FIG. 1, one of the two porous external walls 6b of one of the two modules faces, or even contacts, one of the two porous external walls 6b of the other of the two modules. Furthermore, the two remaining porous external walls 6b are located adjacent, and coplanar so as to form the single porous external wall 5b of the assembly E, intended to be covered by the cover 2b.

Equally, three solid external walls 6a of each of the two modules M1 are located adjacent and coplanar in pairs, so as to form respectively three opposite solid external walls 5a of the assembly E. The remaining solid external wall 6a of each module M1 each forms the whole of one of the solid external walls 5a of the assembly E. These walls 5a, obtained by means of eight solid external walls 6a of the modules, form together the vessel body 2a. Naturally, the design of the two modules M1 can be adapted so that, after they are assembled, no porous external wall remains, the solid walls 6a then forming the whole of the vessel 2, as in the second preferred embodiment, which will be described subsequently.

For attaching the two modules M1, the attaching in pairs of the coplanar solid external walls 6a is preferably done by butt-jointing their two facing edges, and more preferentially by welding these two facing edges forming respectively the end of each of the two walls 6a.

Particularly advantageously, two opposite solid external walls 6a of each module each have the four tubes 4 passing through them. More precisely, the first end 4.1 of each tube 4 passes through one of these two opposite walls 6a, while the second end 4.2 passes through the other of these two opposite solid walls 6a. Consequently, in the assembled state of the two modules M1, these tube ends 4.1, 4.2 enter the vessel and emerge therefrom, passing through two opposite solid walls 5a of the vessel body 2a. According to another possibility that is not shown, the ends 4.1, 4.2 of all the tubes 4 could pass through one and the same solid external wall 5a of the vessel body 2a of the modular assembly E.

In the case where the ends of the tubes pass through separate walls, for example opposite walls as indicated previously, the two passed-through external walls 6a of these modules M1 are therefore preferentially solid walls of these modules.

The modules thus produced are substantially simpler to manufacture than the existing systems, since they do not require attaching one of the plates to be secured to the tubes, for example by welding or flanging.

On the assembly in FIG. 1, the modular assembly E does indeed include five solid external walls 5a, produced in a single piece with their associated porous matrix MA. These walls 5a constitute the vessel body 2a in the form of a tank, and two of these walls 5a have the tubes 4 passing through them at their ends 4.1, 4.2. The single porous external wall 5b is therefore left free for firstly allowing filling of the matrices with the PCM material, and secondly allowing free expansion of the PCM material when it changes state. The open pores of the matrix are emerging, which enables the PCM material to penetrate the matrices from this porous wall 5b. A gas ceiling can be provided at the wall 5b, for example an inert gas ceiling in the case where the PCM material is sensitive to oxidation under the operating conditions of the storage system.

Figure 3:
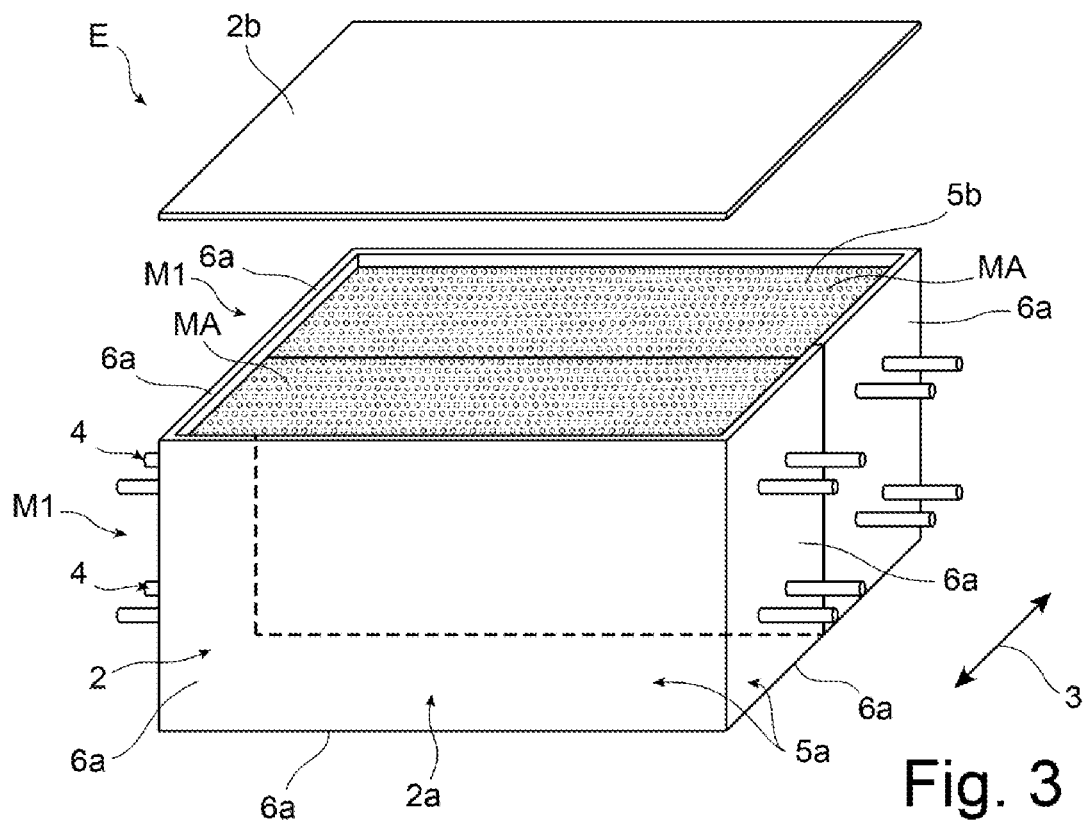
FIG. 3 is a perspective view similar to that of FIG. 1, with the vessel body being in another embodiment.

FIG. 3 shows another modular assembly E very similar to the previous one, wherein the four solid external walls 5a that surround the porous external wall 5b extend beyond the latter so as to form a continuous rim 10 bordering the wall 5b. This rim 10 can advantageously delimit a reservoir for the PCM material.

Thus, when the PCM material expands as it melts, the PCM material then emerges through the porous external wall 5b formed by the two matrices MA, and this reservoir therefore makes it possible to contain the PCM material when it goes into the liquid state. Furthermore, this rim 10 advantageously allows attachment of the cover 2b of the vessel, to close the volume sealingly or not, delimiting a gas ceiling, inert or not, and facilitating manipulation of the heat-storage module.

Figure 4:
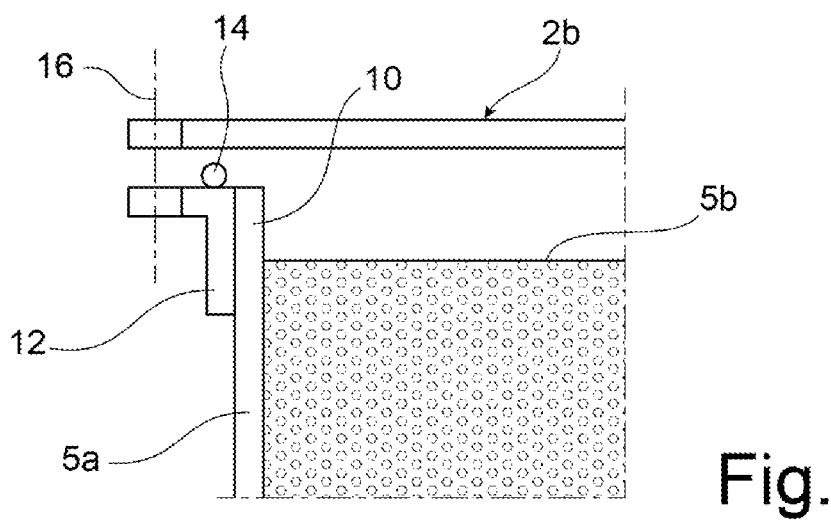
FIG. 4 is a view in cross-section, partially exploded, of a part of the modular assembly shown on the preceding figures.

In this regard, it should be noted that the cover 2b of the assembly E can be welded on the rim 10 defined by the aforementioned four solid external walls 5a. According to an alternative shown on FIG. 4, the assembly of the cover is reversible, preferably by mechanical flanging. To do this, a frame 12 with a cross-section in an L shape is secured by welding to the rim 10, and reversible attachment elements 16 (represented by the axis line), such as bolts, pass through the frame 12 and the cover 2b so as to preferentially crush a gasket 14 between both of them.

By virtue of the reversible mounting of the cover 2b, testing and inspection operations are facilitated. Obviously, this solution is also applicable in the absence of a rim, when the porous external wall 5b fits flush with the ends of the four solid external walls 5a that surround it, as on the assembly E in FIG. 1. To allow such a reversible assembly of the cover, it may be judicious to add attachment studs on the sides of each single-piece cast wall during manufacture, so that these studs can serve as support for attaching the cover to a removable impervious attachment system.

In the case of an irreversible attachment of the cover, for example by welding, tapping points can be produced on the vessel, for example at the hight point and the low point thereof, so as to allow filling/emptying of the PCM material.

Another possibility lies in the production of an inclined surface with tapping at a low point, in order to enable any PCM material to flow, and thus to avoid stagnation. This solution can moreover be envisaged for the cover to be mounted reversible or irreversible.

In the modules M1 described above and forming the assembly E, the tubes 4 are rectilinear and parallel, and the heat-transfer fluid flows only in one direction, during a charging or discharging phase.

Advantageously, the tubes are such that the module has a multipass hydraulic configuration, i.e. the heat-transfer fluid in each tube circulates successively as it flows in the porous matrix in different directions, for example opposite between the two ends of the tube during a charging and discharging phase.

Alternatively, the tubes 4 could adopt the form of a coil and/or turns.

Figure 5:
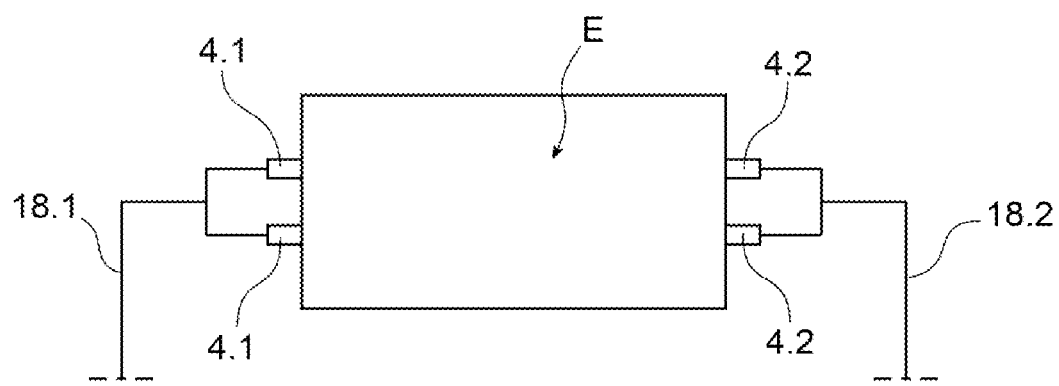
FIG. 5 is a schematic side view of the storage system, showing the connection of the modular assembly to hydraulic service tanks.

Whatever the form adopted for the tubes, these are preferentially connected in parallel by hydraulic supply/collection service tanks, depending on whether it is a case of a charging phase or a discharging phase. For example, in the storage system, the first ends 4.1 of the tubes 4 are connected to a hydraulic service tank 18.1, while the second ends 4.2 of the tubes 4 are connected to another hydraulic service tank 18.2, as shown schematically on FIG. 5.

The multipass configuration that is proposed makes it possible to increase the speed of the heat-transfer fluid, and therefore the convective heat-exchange coefficient of the heat-transfer fluid, and therefore the global exchange coefficient between the heat-transfer fluid and the PCM material.

Preferably, the direction of circulation of the heat-transfer fluid during the charging and discharging phases is such that the PCM material can change volume during changes of phase by applying reduced stresses, or even without applying stresses to the structure. In the case of a PCM material the volume of which increases when passing to the liquid state, preferably the supply of hot heat-transfer medium takes place through the upper part of the module. Thus the PCM material located in the upper part of the module can expand towards the free surface. The supply of cold fluid then preferably takes place through the bottom of the module.

In the examples described, the fluid circulating in the tubes 4 comes from the same hot source or cold source, and it is therefore the same fluid that circulates in all the tubes in parallel or in series.

In another example embodiment, the storage assembly E includes a plurality of separate heat-transfer fluid circulation circuits, for example to circulate different heat-transfer fluids. This is because some applications require having at least two distinct internal heat exchangers, each supplied by a different heat-transfer fluid. For example, a first heat-transfer fluid is used for bringing heat to the heat storage causing melting of the PCM material, while the second heat-transfer fluid is used for discharging the heat storage by recovering the heat generated by the solidification of the PCM material. This configuration is for example encountered when the heat-storage system is at the interface between a source that produces heat, for example a heat pump, and a system that converts heat into electricity at the moment when it is the most opportune, for example an organic Rankine cycle machine. Other examples are possible, such as photovoltaic panels, or any free-heat recovery system.

The heat-transfer fluids encountered in this type of configuration are often two-phase refrigeration fluids. Such a heat-storage means, provided with two distinct internal heat exchangers, is also particularly advantageous on heat networks where it is advantageously positioned at the interface between the primary circuit with a higher temperature and a secondary circuit with a lower temperature. Other applications are also deemed to be advantageous, as in the tertiary sector or for isolated dwellings. According to this integration scheme, the heat-storage means would operate in parallel with the usual heat exchanger that provides the transfer of heat between the primary circuit and the secondary circuit. In this design, the first internal heat exchanger of the heat storage means is supplied by the heat-transfer fluid circulating in the primary circuit, while the second internal heat exchanger of the heat storage means is supplied by the heat-transfer fluid circulating in the secondary circuit. Thus, considering that the primary circuit is higher in temperature than the secondary circuit, such a heat-storage means at the interface between the two circuits is supplied by the primary circuit for charging thereof, i.e. causing melting of the PCM material and therefore recovery and storage of heat, and then would be supplied by the secondary circuit for discharging thereof, i.e. causing crystallisation of the PCM material and therefore restoration of the heat stored. The PCM material is selected according to the temperature at which it changes liquid/solid state so that the supply temperature of the primary circuit is sufficient to cause melting of the PCM material and the supply temperature of the secondary circuit is sufficient to cause crystallisation of the PCM material.

In one example, the heat exchangers are implemented by means of two coaxial tubes, the first heat-transfer fluid circulates in the internal tube while the second heat-transfer fluid circulates in the annular channel formed between the internal tube and the external tube, the first fluid then exchanges heat with the PCM material through the two tubes and the first heat-transfer fluid. In another example, the two heat exchangers are separate and with structures that are different or not. Thus it is possible to select the structure of each heat exchanger that is the most effective in terms of heat transfer for the heat-transfer fluid circulating in each heat exchanger.

As already mentioned above, the invention using a porous matrix moulded around one or more heat exchangers offers great freedom in terms of shape and final geometry for the heat-storage modules M1, and therefore also for the modular assemblies E that result therefrom.

The parallelepipedal form facilitates integration thereof and maximises the useful volume thereof with respect to the surface that they occupy on the ground, which reduces the space occupied on the ground by the heat-storage system that results therefrom. On the other hand, the storage systems of the prior art generally include cylindrical calandrias for containing the PCM material, having a large footprint on the ground compared with their volume.

Moreover, this roughly parallelepipedal form of the modules M1 makes it possible to associate a plurality of modules by juxtaposing them and/or stacking them easily, so as to best adapt to the available space on the ground, and by fluidly connecting them in parallel or in series.

Figure 6:
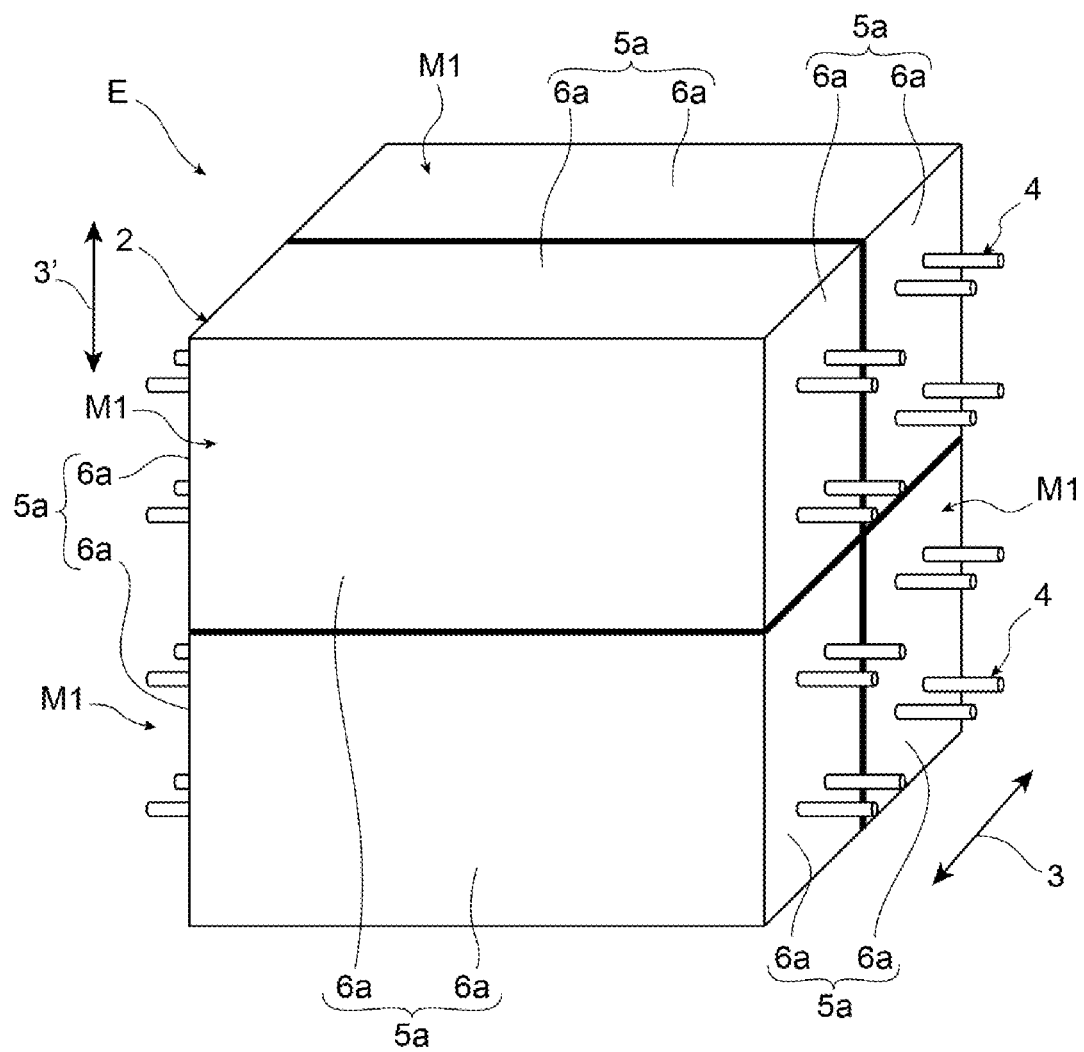
FIG. 6 is a perspective view similar to that in FIG. 1, with the modular assembly being in the form of a second preferred embodiment of the invention.

If the first embodiment in FIG. 1 includes two modules M1 juxtaposed in the stacking direction 3, for example with horizontal orientation, many other solutions remain possible for obtaining the assembly E, for example by means of the same module M1. A second preferred embodiment of this assembly E is shown on FIG. 6. In this second embodiment, it is four modules M1 that are assembled with one another, two of them being juxtaposed in the direction 3, and two other modules M1, also juxtaposed with each other in the direction 3, being stacked on the other two in another stacking direction 3', orthogonal to the direction 3. The direction 3' can correspond to the vertical direction. Thus the modular assembly E includes sixteen tubes 4, each passing through two opposite solid external walls 5a of the assembly E. Each of these two walls 5a being passed through is produced by four coplanar solid external walls 6a belonging respectively to the four modules M1. The remaining four solid external walls 5a, which form the whole of the vessel 2 with the aforementioned two opposite walls 5a, are each produced by two adjacent coplanar solid external walls 6a belonging respectively to two of the four modules M1. Consequently, it is sixteen solid external walls 6a of a module that form the whole of the vessel 2.

Naturally, the design of the four modules M1 can be adapted so that, after assembly thereof, one porous external wall remains, intended to be covered by a cover, as in the first preferred embodiment described above.

Whatever the method envisaged, it is possible to hydraulically isolate one or more modules M1 of the assembly E, for example by means of valves, so that they do not store heat or do not deliver any according to the quantity of heat to be stored or to be recovered respectively, for example according to the seasons. Such a storage system offers great flexibility of operation.

By way of example, each module M1 can have the following dimensions: 1 m×0.25 m×0.5 m and an external volume (exclusive of hydraulic connections and exclusive of the vessel) of approximately 0.0625 $m^3$.

Such dimensions allow easy stacking of the modules, in one or more directions. The porous matrix MA may have a porosity of between 75% and 95% occupied almost completely by the PCM material. Each module can store thermal energy of between 4 and 20 kilowatt-hours.

By way of example, considering a substation in a heat system having against a wall a free volume for storing heat of 0.5 m×1 m on the ground over a height of 3 m, it would be possible to install a heat-storage system composed of a stack of twenty-four unit modules having a total volume of 1.5 $m^3$. The same system composed of two cylindrical vessels of traditional design would have only a total volume of 1.17 $m^3$, i.e. at a minimum 20% less thermal energy storage capacity.

The invention makes it possible to release space storing PCM material.

The method used for manufacturing the storage assembly according to the invention allows overmoulding of foam directly on the tubes, which was not possible with any other type of stochastic foam.

Overmoulding aluminium foam on the steel tubes ensures stressing of the steel/aluminium interface guaranteeing close and durable metal/metal bonding. Integrating the heat exchangers in the foam allows better heat transfer between the heat transfer medium and the PCM material, which makes it possible to reduce the number of heat exchangers, for example the number of tubes. Using fewer tubes offers the possibility of using hydraulic service tanks for the hydraulic distribution and the hydraulic collection of the heat-transfer fluid at the connection ends of the heat exchangers. The use of hydraulic service tanks, preferably equipped with balancing members, offers several advantages. First of all, it makes it possible to dispense with the use of water boxes involving recourse to plates for producing the interface with the cluster of tubes often used in the traditional design. The use of plates, also referred to as tube collecting plates, involves many expensive assembly operations (obtained by welding or by flanging) to produce the connection between the plate or plates and the tubes. It is thus necessary to have two assembly operations per tube. These assembly operations may furthermore constitute weakened zones when they involve welding operations.

Using hydraulic service tanks also simplifies the assembly operations. The welds are done outside the heat-storage module between the connection ends of the heat exchangers and the service tanks.

The connection by welding is advantageously butt welding or done by the use of couplings, for example of the union type, offering much better mechanical strength than the usual tube on tubular plates connections. Moreover, the possibility of producing welded connections outside the module facilitates accessibility thereof, in particular for periodic testing/inspection operations. Furthermore, avoiding the use of water boxes for the hydraulic distribution and collection of the heat-transfer fluid from the mould using hydraulic service tanks instead makes it possible to reduce the volume of heat-transfer fluid contained in these components. Should the heat-transfer fluid be pressurised, the possibility of reducing the volume contained in the module makes it possible to lighten and limit the design constraints, in particular in the case of use of pressurised fluid. Reducing the number of tubes makes it possible not to have recourse to inserts, reducing the cost and complexity of the module. The storage energy density of the module can be increased since the volume released by the fewer tubes can be replaced by PCM material. The absence of inserts in the tubes can reduce the risks of fouling in the tubes in some cases.

An example of a method for manufacturing the heat-storage module M1 will now be described.

FIGS. 7A to 7F show various steps schematically of an example of a method for manufacturing the heat-storage module M1.

First of all cores are supplied that are manufactured by aggregating elements by means of a binder, for example a polyurethane. The elements are placed in a mould with a shape corresponding to that of the preform PR that it is wished to produce in order to obtain the cores N. To guarantee correct stacking of the cores in a mould, the elements are deposited layer by layer and the number of layers depend on the shape and size of the preform PR.

Figure 7A:
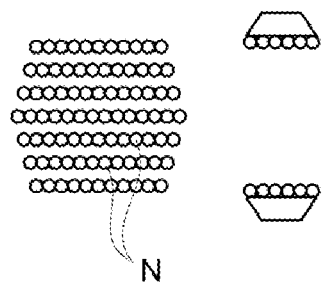
FIGS. 7A-7F are schematic representations of various steps of an example of a method for manufacturing a heat-storage module.
Figure 7B:
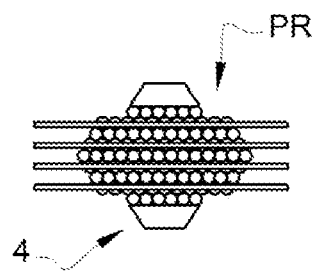

The steel tubes are placed in the core layers N, a space provided for this purpose is incorporated, for example by CAD. Around each tube and between the cores a layer of aluminium clads the steel tube to maximise the overmoulding and the thermal bonding (FIG. 7B).

Figure 7C:
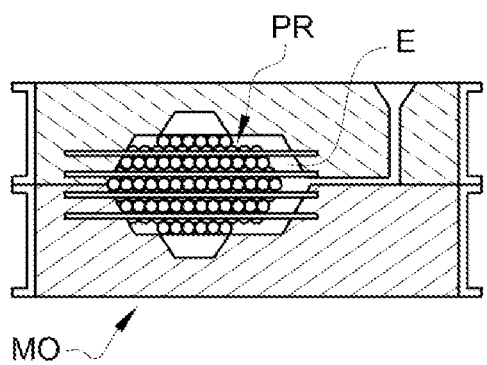

The preform PR is disposed in a mould MO (FIG. 7C). The mould is for example made from sand or from a metal material. The mould and the arrangement of the preform in the mould are such that an empty space E' between the preform and an internal wall of the mould MO is formed so that, during moulding, a solid external wall in the material of the matrix will be formed on a face of the porous matrix and around the ends of the tubes.

Figure 7D:
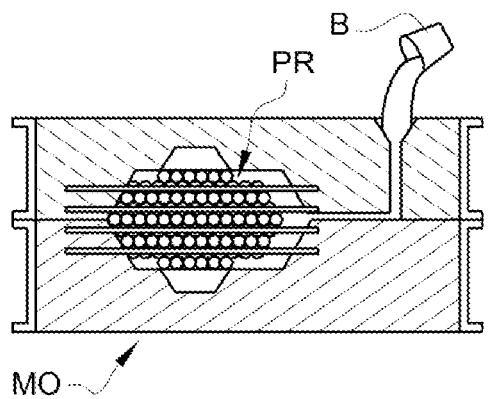
Figure 7E:
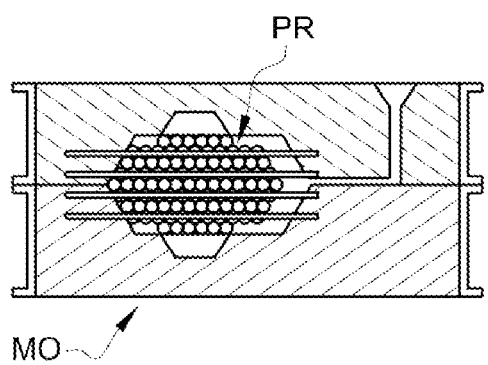
Figure 7F:
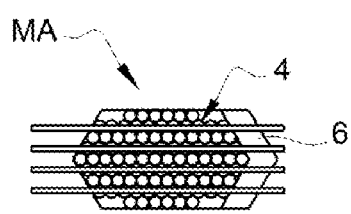

In a following step shown on FIG. 7D, a bath of metal B, for example aluminium, is prepared and then the liquid metal is injected into the preform. The filling system and the temperature of the metal are adapted to the configuration of the matrix to be manufactured. Software making it possible to calculate the metal injection distances can be used. The metal is solidified (FIG. 7E), and at this stage the preform is still contained in the part and must therefore be destroyed. To do this, the part is immersed in a solvent, so that the preform dissolves. The part obtained after destruction of the preform has two types of zones: hollow foam zones, in place of the preform, and solid alloy zones in place of the empty space. The part may thus have a "skin" around the foam zone (FIG. 7F). The metal is finished and the module finished in particular by attaching the other parts of the vessel, for example by welding.

The module can next be filled with PCM material. This filling of the module with PCM can take place when the module is in place and connected to the heat-transfer fluid system to ensure the addition of heat necessary for melting the PCM. During the filling the PCM can be added in the form of powder, in the form of granules a few millimetres in diameter (generally between 1 mm and 3 mm) or directly in liquid form, i.e. after having been previously heated to be melted).

The method for manufacturing the matrix may include a check on the form of the cores, a check on the porosity of the metal before pouring, a measurement of the temperature of the metal before pouring, a check on the metallurgy of the metal before pouring. Naturally, various modifications can be made by a person skilled in the art to the invention that has just been described, solely by way of non-limitative examples, and the scope of which is defined by the accompany claims. In particular, the various embodiments that have been described can be combined, and their features interchangeable.

The invention claimed is:

1. Modular assembly for storing heat by phase-change material including a plurality of heat-storage modules attached to one another, the heat-storage assembly comprising a vessel,
   each module for storing heat by phase-change material being delimited by a plurality of external walls, and comprising:
      at least one heat exchanger including first and second connection ends intended to be connected to a heat-transfer fluid system, said first and second connection ends entering and emerging from the vessel,
      a structure intended to contain a phase-change material, said structure comprising a porous matrix with communicating cells through which said heat exchanger passes and in contact with the external surface of said heat exchanger, said matrix being obtained by moulding around said heat exchanger,
      at least one of the external walls of the module, referred to as a solid external wall, being formed by moulding directly on the porous material so as to form a part of said vessel of the heat-storage assembly,
      at least one of the other external walls of the module, referred to as a porous external wall, being formed by the porous matrix,
      and, among the modules of the heat-storage assembly, at least two adjacent modules are disposed so that a porous external wall of one of the modules is arranged facing a porous external wall of the other one of the modules, and so that a solid external wall of one of the modules is attached to a solid external wall (6a) of the other one of the modules.

2. The modular assembly according to claim 1, wherein said first and second connection ends of said heat exchanger pass through at least one solid external wall of each heat-storage module.

3. The modular assembly according to claim 1, wherein the vessel is entirely produced by solid external walls of the modules.

4. The modular assembly according to claim 1, wherein the vessel is produced by solid external walls of the modules to form a vessel body, closed by a cover attached to these solid external walls.

5. The modular assembly according to claim 4, wherein the cover is attached by mechanical flanging on the vessel body.

6. The modular assembly according to claim 1, wherein two solid external walls of two adjacent modules are attached to each other by butt-jointing their facing edges,.

7. The modular assembly according to claim 1, wherein at least one of the solid external walls of the modules is formed directly during the moulding of the matrix and in a single piece with this matrix.

8. The modular assembly according to claim 1, wherein at least one of the solid external walls of the modules is formed on the matrix after the moulding thereof.

9. The modular assembly according to claim 8, wherein at least one of the solid external walls of the modules is made from a material having thermal conductivity lower than that of the matrix of its associated module.

10. The modular assembly according to claim 1, wherein the porous matrix is made from metal material, for example aluminium or aluminium alloy.

11. The modular assembly according to claim 1, wherein said heat exchanger is a tube.

12. The modular assembly according to claim 1, wherein at least one of the modules is equipped with a plurality of heat exchangers, preferably configured to be connected in parallel to a heat-transfer fluid system and wherein the first connection ends are intended to be connected to a hydraulic service tank and the second connections ends are intended to be connected to a second hydraulic service tank.

13. The modular assembly according to claim 1, wherein each module has a roughly parallelepipedal shape, and wherein they are assembled so that the storage assembly also has a roughly parallelepipedal shape.

14. The modular assembly according to claim 13, formed by two modules in each of which four of six external walls are solid external walls, and other two porous external walls, the two modules being assembled with each other so that the eight solid external walls form a vessel body, closed by a cover attached to these solid external walls.

15. The modular assembly according to claim 13, formed by four modules in each of which four of six external walls are solid external walls, and other two porous external walls, the four modules being assembled with each other so that the sixteen solid external walls form the whole of the vessel.

16. A heat-storage system including at least one modular assembly according to claim 1, and phase-change material filling the cells of the matrices of the modules.

17. A method for manufacturing a modular heat-storage assembly according to claim 1, including the manufacture of the modules, then the attachment thereof to one another by attaching their solid external walls to one another.

18. The manufacturing method according to claim 17, wherein the manufacture of each module comprises:
   supplying a preform comprising core plates and at least one heat exchanger between the cores,
   placing the preform in a mould,
   introducing a liquid metal into the preform,
   solidifying the metal,
   removing the cores.

* * * * *